United States Patent
Zeng et al.

(10) Patent No.: US 11,530,036 B2
(45) Date of Patent: Dec. 20, 2022

(54) FIXED-WING AERIAL UNDERWATER VEHICLE AND CONTROL METHOD THEREOF

(71) Applicant: SHANGHAI JIAO TONG UNIVERSITY, Shanghai (CN)

(72) Inventors: Zheng Zeng, Shanghai (CN); Lian Lian, Shanghai (CN); Di Lu, Shanghai (CN); Ping Ren, Shanghai (CN); Xiafei Ma, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 268 days.

(21) Appl. No.: 16/956,868

(22) PCT Filed: Jan. 10, 2018

(86) PCT No.: PCT/CN2018/072018
§ 371 (c)(1),
(2) Date: Jun. 22, 2020

(87) PCT Pub. No.: WO2019/119556
PCT Pub. Date: Jun. 27, 2019

(65) Prior Publication Data
US 2021/0061458 A1 Mar. 4, 2021

(30) Foreign Application Priority Data
Dec. 20, 2017 (CN) .......................... 201711386555.4

(51) Int. Cl.
*B64C 37/00* (2006.01)
*B63G 8/00* (2006.01)
(Continued)

(52) U.S. Cl.
CPC .............. *B64C 37/00* (2013.01); *B63G 8/001* (2013.01); *B63G 8/08* (2013.01); *B63G 8/16* (2013.01);
(Continued)

(58) Field of Classification Search
CPC ... B64C 27/26; B64C 37/00; B64C 2201/108; B64C 2201/042; B64C 2201/027; B60F 5/02
See application file for complete search history.

(56) References Cited

U.S. PATENT DOCUMENTS

2016/0114887 A1* 4/2016 Zhou .................... G06Q 20/367
348/148
2016/0376000 A1* 12/2016 Kohstall ............... B64C 39/024
114/313
(Continued)

*Primary Examiner* — Tye William Abell
(74) *Attorney, Agent, or Firm* — Bayramoglu Law Offices LLC

(57) ABSTRACT

A fixed-wing aerial underwater vehicle includes a shell component, a flight component and a pneumatic buoyancy component. The flight component includes a fixed wing and rotors, and the fixed wing and the rotors are mounted in the shell component. The pneumatic buoyancy component includes an air bladder and an inflation and deflation portion, and the inflation and deflation portion can inflate and deflate the air bladder. The air bladder is installed on the shell component, a containing space is formed in the shell component, and the inflation and deflation portion is partially or entirely installed in the containing space. Each rotor includes a rotor supporting rod, a motor base, a motor and a propeller, which are sequentially connected. A control method for the fixed-wing aerial underwater vehicle mentioned above is further provided.

17 Claims, 3 Drawing Sheets

(51) Int. Cl.
*B63G 8/08* (2006.01)
*B63G 8/16* (2006.01)
*B64C 27/26* (2006.01)

(52) U.S. Cl.
CPC ........ *B64C 27/26* (2013.01); *B63G 2008/002* (2013.01); *B64C 2201/027* (2013.01); *B64C 2201/042* (2013.01); *B64C 2201/108* (2013.01)

(56) References Cited

U.S. PATENT DOCUMENTS

2019/0270355 A1* 9/2019 Edwards .................. B63G 8/22
2019/0351996 A1* 11/2019 Livieratos ............... B64C 11/30

* cited by examiner

FIXED-WING AERIAL UNDERWATER VEHICLE AND CONTROL METHOD THEREOF

CROSS REFERENCE TO THE RELATED APPLICATIONS

This application is the national phase entry of International Application No. PCT/CN2018/072018, filed on Jan. 10, 2018, which is based upon and claims priority to Chinese Patent Application No. 201711386555.4, filed on Dec. 20, 2017, the entire contents of which are incorporated herein by reference.

TECHNICAL FIELD

The present invention relates to an autonomous vehicle, and more particularly relates to a fixed-wing aerial underwater vehicle and a control method thereof.

BACKGROUND

As an emerging mobile underwater observation platform, underwater glider has been playing an increasingly important role in marine resource exploration, environmental monitoring, seabed detection and other military and civilian fields, due to its advantages of low power consumption, long endurance and low cost. The buoyancy adjustment mechanism is adopted to change the net buoyancy, and the posture adjustment mechanism is adopted to adjust the position of the gravity center, so that the glider performs the up and down motion, and changes the pitch and roll angle. The glider only relies on the net buoyancy as the driving force, and its operation speed and maneuverability are not as good as the other underwater vehicles driven by propellers. A variety of underwater gliders have been developed in China and other countries, such as Slocum, Seaglider, Spray and other underwater gliders developed by U.S., and Petrel developed by the Tianjin University, Sea-wing developed by Shenyang Institute of automation, China Academy of Sciences, and Seagull developed by Shanghai Jiao Tong University, etc. However, the underwater glider focuses on underwater observation and detection, cannot perform air-sea joint observation, and need support vessels for release and recovery.

The common Unmanned Aerial Vehicles (UAVs) include two categories: fixed-wing UAV and rotorcraft UAV. Fixed-wing UAV mainly relies on the lift force of the wing to balance the its gravity, its speed is fast, and has relatively long endurance, but the take-off and landing distance is long, and it cannot take off or land vertically, and its hover and maneuverability is limited. Multi-rotor flight control is relatively simple, can achieve take-off and landing vertically, can perform hover and forward backward and many other motions, mobility is more flexible, however rotorcraft UAV has higher flight resistance and higher power consumption than the fixed-wing UAV, thus affecting the flight speed and endurance, consequently, its efficiency is inferior to the fixed-wing UAV. UAVs have high level of autonomy, their operation is relatively simple, they can follow scheduled routes, and provide real-time monitoring data and video. However, their function is still limited, they cannot dive into the water and perform underwater detection and observation.

A number of hybrid aerial underwater vehicles have been carried out in recent years. The Georgia Technology University released GTQ-Cormorant prototype, which uses wireless remote control mode and is equipped with small video cameras. The water tank experiments prove the prototype can fly in the air and dive into the water, but its endurance is limited. Rutgers University released Naviator, which can switch movement in the air and water through the coaxial arrangement of the two sets of propeller, and water tank experiments verify the ability of the vehicle in cross-domain operation in both the aerial and underwater environments. But Naviator is tethered to the ground control station, which greatly limits its flying distance, the prototype has very limited load capacity, will be difficult to complete detect, search or rescue missions. Loon Copter developed by Oakland University chose to use wireless remote control mode, and moves up and down by pumping in and out water, water tank experiments verify that Loon Copter can complete fly motion, is able to dive a few meters underwater, and perform shooting tasks. These above aircrafts commonly use multi-rotor techniques, their common drawback is that the endurance in both air and underwater is extremely limited, which cannot meet the desire of persistent sea-air observation.

SUMMARY

In view of the disadvantages in the prior art, the aim of the present invention is to provide a fixed-wing aerial underwater vehicle and control method thereof.

In accordance with the invention, the fixed-wing aerial underwater vehicle includes a shell component, a flight component and a pneumatic buoyancy component.

The flight component includes a fixed wing and rotors, and the fixed wing and the rotors are all mounted on the shell component.

The pneumatic buoyancy component includes an air bladder and an inflation and deflation portion. The air bladder is connected to the inflation and deflation portion, and the inflation and deflation portion is configured to inflate and deflate the air bladder.

The air bladder is installed on the shell component. A containing space is formed in the shell component. The inflation and deflation portion is partially or entirely installed in the containing space.

Preferably, each rotor comprises a rotor supporting rod, a motor base, a motor, and a propeller which are sequentially connected.

The plurality of rotors are arranged along the circumferential direction of the shell component.

Preferably, the propeller includes an auto-folding propeller, and the auto-folding propeller includes an auto-folding propeller hub and a pair of auto-folding aerial propeller blades.

The motor includes a waterproof brushless motor.

Preferably, the inflation and deflation portion includes a gas cylinder, a solenoid valve, an inflation pipe penetration member, and a deflation pipe penetration member.

The solenoid valve includes an inflation solenoid valve and a deflation solenoid valve.

The gas cylinder, the inflation pipe penetration member, the air bladder and the deflation pipe penetration member are sequentially connected.

Preferably, the air bladder is an annular air bladder, and the annular air bladder is sleeved on the shell component.

A vent relief valve is arranged on the annular air bladder.

Preferably, a depth sensor, a receiver, an electronic speed controller, a battery and a controller are installed in the containing space.

The electronic speed controller includes a four-in-one electronic speed controller, and the battery includes a lithium battery.

A pressure sensor is arranged on the air bladder.

Preferably, the controller includes:

a signal acquisition module, wherein the signal acquisition module is configured to obtain a depth signal, a pressure signal and a remote control signal;

a flight control module, wherein the flight control module is configured to control the flight component to operate; and a buoyancy control module, wherein the buoyancy control module is configured to control the pneumatic buoyancy component to operate.

Preferably, the shell component comprise a sealed bottom cap, a sealed pressure shell, a sealed end cap and a top fairing which are sequentially connected.

The sealed bottom cap is spherical, and the top fairing is ellipsoid.

Preferably, a supporting plate and a fixed-wing supporting ring are arranged on the shell component.

The rotors are fixedly connected to the shell component by the supporting plate, and the fixed wing is fixedly connected to the shell component by the fixed-wing supporting ring.

The fixed-wing supporting ring includes an upper fixed-wing supporting ring and a lower fixed-wing supporting ring which are arranged along the axial direction of the shell component.

The present invention further provides a control method for the fixed-wing aerial underwater vehicle, including the following steps:

flying out of water: opening the inflation solenoid valve to inflate an annular air bladder; when an air pressure in the annular air bladder reaches a set value, closing the inflation solenoid valve, then a waterproof brushless motor operating and an auto-folding propeller rotating and unfolding;

flying control: controlling an output current of the waterproof brushless motor by a four-in-one electronic speed controller to cause the rotational speed difference between a plurality of auto-folding propellers to achieve different motions.

entering the water: turning off the waterproof brushless motor, the auto-folding propellers folding, opening a deflation solenoid valve to deflate the annular air bladder; when the air pressure in the annular air bladder reaches the set value, closing the deflation solenoid valve; and gliding underwater: controlling an opening or a closing of the inflation solenoid valve and the deflation solenoid valve to change a volume of the annular air bladder.

Compared with the prior art, the present invention has the following advantages.

1. The fixed-wing aerial underwater vehicle provided by the present invention can achieve large scale flight observation in the air and long range underwater gliding, and rely on the vertical take-off and landing function to switch between different modes in water and air.

2. Different from traditional buoyancy adjustment scheme used by underwater gliders, the present invention develops a pneumatic solution for changing the buoyancy, which greatly contributes to simplify the system and deduce its gravity, this novel pneumatic solution of the present not only retains the buoyancy change ability as the traditional underwater glider, and is helpful to reduce the gravity of the whole body and improve the flying ability of the vehicle.

3. The present invention proposes to change the air volume of the annular air bladder, which can realize the coupling control of the net buoyancy and the attitude angle.

4. The present invention integrates the concept of fixed-wing and rotorcraft, and integrates the rotor propulsion system and the fixed-wing propulsion system on the fixed wing, and the fixed-wing aerial underwater vehicle of the present invention is able to achieve cross-domain operation in both the aerial and underwater environments.

BRIEF DESCRIPTION OF THE DRAWINGS

Further non-limiting embodiments are provided to illustrate the advantages and flexibility of the present invention with reference to the following drawings.

In the figures.

Figure 1:
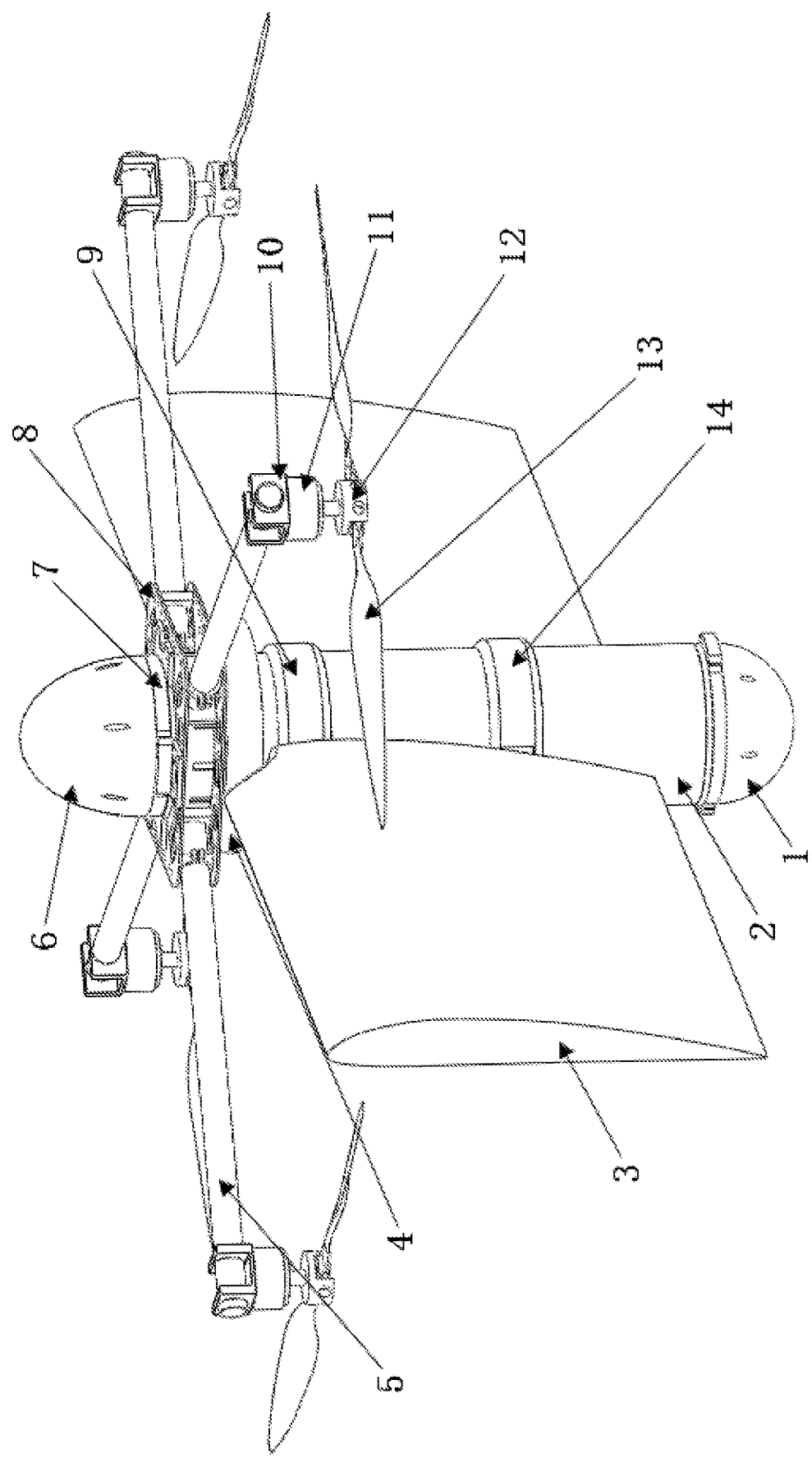
FIG. 1 shows the structure of the fixed-wing aerial underwater vehicle.

Sealed bottom cap 1
Sealed pressure shell 2
Fixed wing 3
Annular air bladder 4
Rotor supporting rod 5
Top fairing 6
Sealed end cap 7
Supporting plate 8
Upper fixed-wing supporting ring 9
Motor base 10
Waterproof brushless motor 11
Auto-folding propeller hub 12
Auto-folding aerial propeller blade 13
Lower fixed-wing supporting ring 14
Solenoid valve 15
High-pressure gas cylinder 16
Controller 17
Vent relief valve 18
Inflation pipe penetration member 19
Deflation pipe penetration member 20
Depth sensor 21
Pressure sensor 22
Receiver 23
four-in-one electronic speed controller 24
Lithium battery 25

DETAILED DESCRIPTION OF THE EMBODIMENTS

The present invention is explained in detail with reference to the specific embodiments. The following embodiments will help those skilled in the art to further understand the present invention, but do not restrict the present invention in any form. It should be pointed out that, for those having ordinary skill in the art, a number of changes and improvements can be made without departing from the idea of the present invention, and all these changes and improvements shall fall within to the scope of protection of the invention.

In the description of the present invention, it should be noted that the term "on" and "down", "front" and "rear", "left" and "right", and "vertical" and "horizontal", "top" and "bottom", "inside" and "outside" indication range or the position relation based on the range shown in the drawings or position, only to facilitate the description of the present invention and simplify the description, not indicate or suggest devices or components that must have a specific direction in the construction or operation, and thus cannot be understood as a limitation to the present invention.

As shown in FIG. 1, the present invention provides a fixed-wing aerial underwater vehicle, including a shell component, a flight component and a pneumatic buoyancy component. The flight component includes the fixed wing 3 and rotors, and the fixed wing 3 and the rotors are all mounted on the shell component. The pneumatic buoyancy component includes an air bladder and an inflation and deflation portion. The air bladder is connected to the inflation and deflation portion, and the inflation and deflation portion can inflate and deflate the air bladder. The air bladder is installed inside the shell component to form a containing space, the inflation and deflation portion is partially or entirely installed in the containing space. As shown in FIG. 1, the shell component comprises the sealed bottom cap 1, the sealed pressure shell 2, the sealed end cap 7 and the top fairing 6, which are sequentially connected. The sealed bottom cap 1 is spherical. The sealed bottom cap 1 can not only perform pressure seal on the bottom end of the sealed pressure shell 2, but also can reduce the water resistance against the vehicle gliding under water by taking advantage of its streamline shape. The sealed end cap 7 is configured to seal the top end of the sealed pressure shell 2. The ellipsoidal top fairing 6 is configured to improve the flow field around the vehicle when the vehicle operates in the air and water, and reduce the resistance. The sealed pressure shell 2 is configured to provide waterproof and pressure protection for all components of the vehicle in need, while providing buoyancy. The supporting plate 8 and the fixed-wing supporting ring are arranged on the shell component. The rotors are fixedly connected to the shell component by the supporting plate 8, and the fixed wing 3 is fixedly connected to the shell component by the fixed-wing supporting ring. The fixed-wing supporting ring includes the upper fixed-wing supporting ring 9 and the lower fixed-wing supporting ring 14 which are arranged along the axial direction of the shell component. In the horizontal flying mode, the fixed wing 3 provides a lift to balance the body's gravity, ensuring that the present invention can fly stably. The air bladder 4 includes the annular air bladder 4. The annular air bladder 4 is connected to the upper end of the sealed pressure shell 2. During the operation, the position of the annular air bladder 4 is also the heading direction of the underwater gliding mode and the flying mode. By inflating or deflating the annular air bladder 4, the volume of the annular air bladder 4 is changed, so as to provide different underwater net buoyancy for the body of the present invention, and thus the body is driven to perform saw-tooth motion when gliding underwater. Each rotor includes the rotor supporting rod 5, the motor base 10, the motor and the propeller which are sequentially connected. A plurality of rotors are mounted along the circumferential direction of the shell component. In the present embodiment, the supporting plate 8 is located on the upper end of the sealed pressure shell 2, and four rotors are evenly mounted along the circumferential direction of the sealed pressure shell 2. The motor includes the waterproof brushless motor 11. The propeller includes the auto-folding propeller. The auto-folding propeller includes the auto-folding propeller hub 12 and a pair of auto-folding aerial propeller blades 13, and the pair of auto-folding aerial propeller blades 13 are installed on the auto-folding propeller hub 12. The auto-folding aerial propeller blades 13 can convert between open and contraction two states. The waterproof brushless motor 11 is fixed on the motor base 10 and the motor 11 is in the downward facing direction. When the auto-folding propeller hub 12 is driven to rotate at a high speed by the waterproof brushless motor 11, the auto-folding aerial propeller blades 13 provide the lifting force required by the vertical take-off and landing (VTOL) and the propulsion power needed for horizontal fly.

Figure 2:
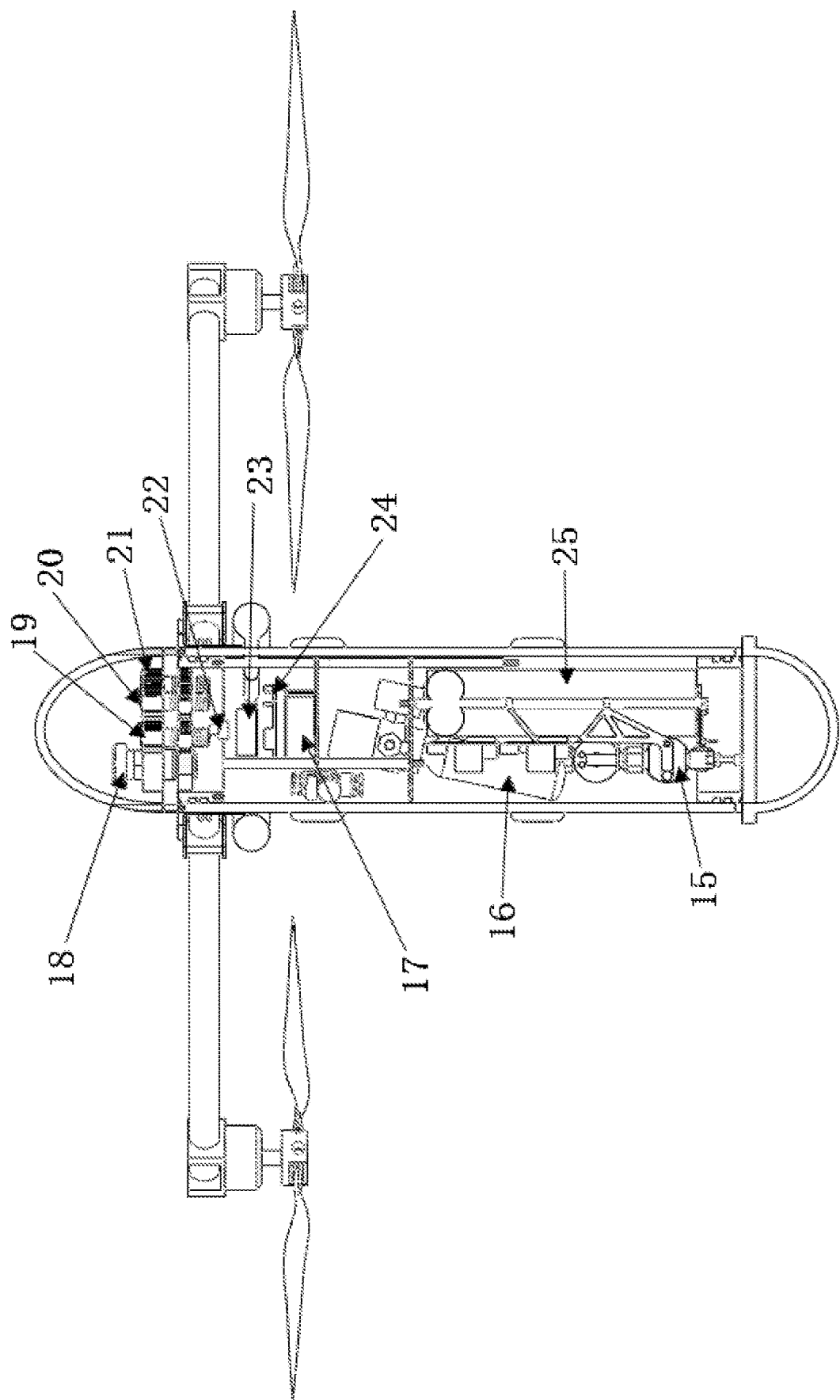
FIG. 2 shows the perspective of the fixed-wing aerial underwater vehicle.

As shown in FIG. 2, the inflation and deflation portion includes the gas cylinder, the solenoid valve 15, the inflation pipe penetration member 19 and the deflation pipe penetration member 20. The solenoid valve 15 includes an inflation solenoid valve and a deflation solenoid valve. The vent relief valve 18 is arranged on the annular air bladder 4, and the pressure sensor 22 is arranged in the annular air bladder 4. The depth sensor 21, the receiver 23, the electronic speed controller, the battery and the controller 17 are arranged in the containing space. In the present embodiment, the gas cylinder is a high-pressure gas cylinder 16 for storing the high pressure gas, and the electronic speed controller is the four-in-one electronic speed controller 24, and the battery is the lithium battery 25. Preferably, the electronic speed controller can also be four separate electronic speed controllers, and the battery may also be selected according to the type as needed. The controller includes the following modules: a signal acquisition module, wherein the signal acquisition module is configured to acquire a depth signal, a pressure signal and a remote control signal; a flight control module, wherein the flight control module is configured to control the operation of flight components; a buoyancy control module, wherein the buoyancy control module is configured to control the operation of the pneumatic buoyancy component.

Two solenoid valves 15 and the high-pressure gas cylinder 16 are the main actuators for adjusting the dynamic buoyancy component. The two solenoid valves 15 are opened/closed as instructed by the controller, so that the gas in the high pressure gas cylinder 16 inflates the annular air bladder 4 or the gas in the annular air bladder 4 is deflated to the outside, thereby changing the buoyancy of the vehicle when the vehicle operates underwater. The controller 17 as the brain of the vehicle can observe the external environment and its current status through the sensors therein, and can follow the operator's command to control the vehicle. The vent relief valve 18 is directly communicated with the annular air bladder 4 and can deflate the annular air bladder 4 to prevent the charge explosion. The inflation pipe penetration member 19 and the deflation pipe penetration member 20 are configured to connect the pneumatic buoyancy component inside the sealed pressure shell 2 and the annular air bladder 4 outside the sealed pressure shell 2. The depth sensor 21 can sense the depth, to provide the necessary environmental parameters for the controller 17 to make decisions. The pressure sensor 22 inside the air bladder 4 is configured to real-time sense the air pressure in the air bladder 4, and feedback to the controller 17 to dynamically control the buoyancy. The receiver 23 is configured to receive a remote control command from the operator and send the remote control command to the controller 17. The four-in-one electronic speed controller 24 is configured to control the speed of the waterproof brushless motor 11 to generate different lifting forces for the rotors. The lithium battery 25 is configured to supply power to all components.

The present invention further provides a control method for the fixed-wing aerial underwater vehicle mentioned above, which includes the following steps: flying out of the water: the inflation solenoid valve is open to inflate the annular air bladder 4, and when the air pressure in the annular air bladder 4 reaches a set value, the inflation solenoid valve is closed, then the auto-folding propellers unfold, the waterproof brushless motors 11 operate, and the auto-folding propellers rotate and unfold; flying control: the four-in-one electronic speed controller 24 controls the output current of the waterproof brushless motors 11 to generate the rotational speed difference between these auto-folding propellers to achieve different motions; entering into water: the waterproof brushless motors 11 are turned off, the auto-folding propellers fold, the deflation solenoid valve is opened to deflate the annular air bladder 4, and when the air pressure in the annular air bladder 4 reaches a set value, the deflation solenoid valve is closed; gliding underwater: the inflation solenoid valve and the deflation solenoid valve are control to be opened or closed to inflate or deflate the annular air bladder, thereby changing the volume of the annular air bladder 4.

Figure 3:
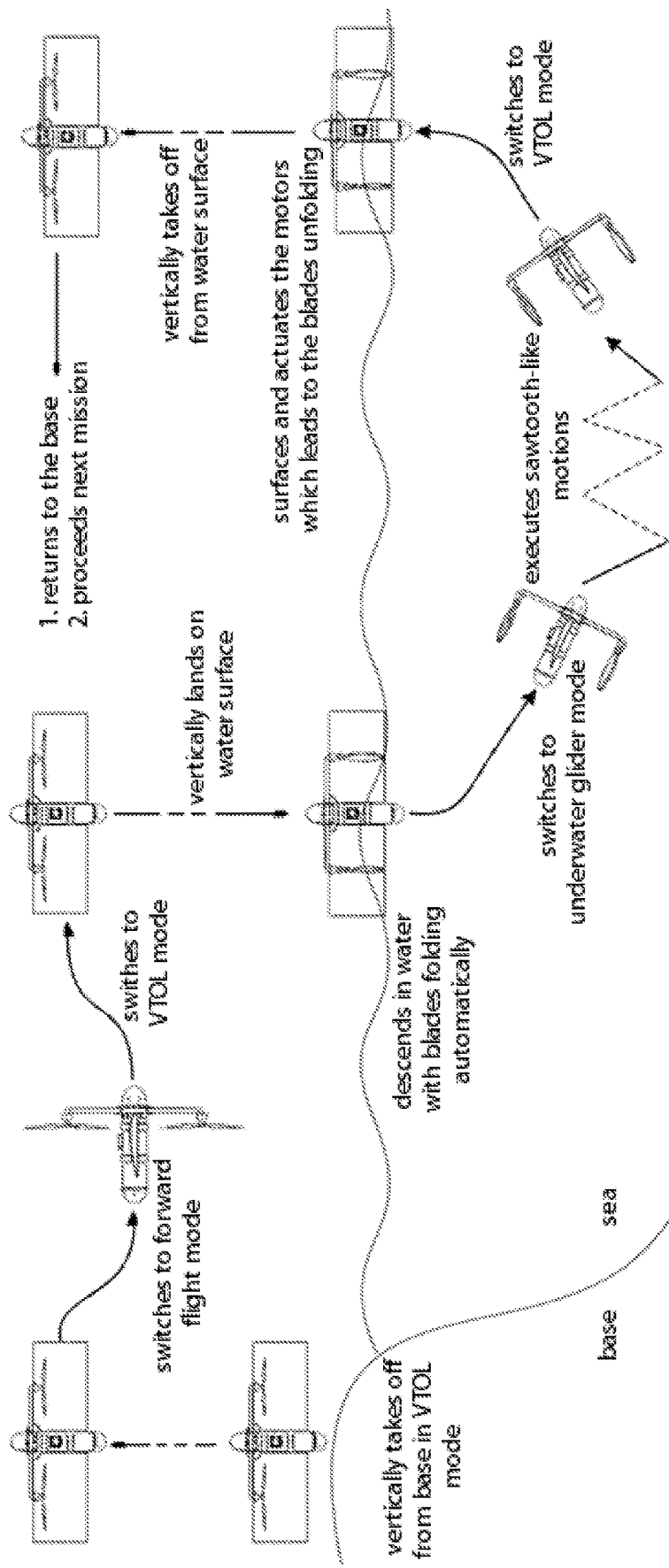
FIG. 3 shows the schematic diagram of multi-modal locomotion and cross-domain operation of the fixed-wing aerial underwater vehicle.

As shown in FIG. 3, the fixed-wing aerial underwater vehicle provided by the present invention can achieve large scale flight observation in the air and long range gliding underwater observation, and rely on the vertical take-off and landing function to achieve cross-domain operation in both the aerial and the underwater environments. When the present invention turns from the underwater gliding mode to the forward flight mode, the controller 17 firstly sends a command to open the inflation solenoid valve, the gas in high-pressure gas cylinder 16 passes through the pipe via the inflation solenoid valve and then reaches the annular air bladder 4, so that the annular air bladder 4 is inflated, and the buoyancy of the vehicle is increased. When the buoyancy of the vehicle becomes larger than the gravity of the vehicle, the vehicle began to ascent, until the air pressure in the annular air bladder 4 reaches a set value, that is to say, after the annular air bladder 4 expands to a preset maximum volume, the controller 17 sends out a command to close the inflation solenoid valve to stop inflating the annular air bladder 4, and the annular air bladder 4 is maintained in the maximum volume until the vehicle emerges from the water surface. In the process of inflating the annular air bladder 4, the attitude of the vehicle is also changing, the nose of the vehicle elevates, the body of the vehicle gradually reaches close to the vertical state, when the annular air bladder 4 reaches the maximum volume, the attitude angle of the vehicle reaches its maximum, and the body of the vehicle will be near vertical and gets ready for vertical take-off from the water surface. After the body reaching the water surface, the controller 17 send a throttle command to the four-in-one electronic speed controller 24, then the four-in-one electronic speed controller 24 processes the throttle command and outputs various currents to the four waterproof brushless motors 11, the motors will rotate at high speeds and meanwhile the auto-folding aerial propeller blades 13 are driven by the waterproof brushless motors 11 to rotate, due to their rotation at high speeds, the auto-folding aerial propeller blades unfold under the effect of centrifugal force. When the lifting force provided by the auto-folding aerial propeller blades 13 increases further to overcome the gravity of the vehicle and the resistance of external flow field, the vehicle realizes the vertical take-off out of the water. After the vehicle reaches a certain height, the controller 17 controls various speeds among the four pairs of auto-folding aerial propeller blades 13, so that each pair of auto-folding aerial propeller blades 13 generates different forces and finally generates the pitching force to continuously cause the body to tilt. Since the auto-folding aerial propeller blades 13 always point to the nose direction, when the body tilts, the vehicle will also accelerate forward speed. With the increase of the horizontal speed, the aerodynamic effect of the fixed wing 3 increases gradually, and the lifting force provided by the fixed wing 3 increases gradually. This lifting force compensates for loss of force generated from the four pairs of auto-folding aerial propeller blades when the four pairs of auto-folding aerial propeller blades gradually point to the horizontal direction, which plays a role in balancing the gravity of the vehicle. Finally, the vehicle is stable in the forward flight mode. When the vehicle transit from the forward flight mode to the underwater gliding mode, the controller 17 command the four-in-one electronic speed controller 24 to differentiate the spinning rates of the four waterproof brushless motors 11 firstly. Consequently, the four auto-folding propellers 13 contribute to a reverse pitch moment by which the vehicle will switch from the forward flight mode to the hovering mode gradually. During the switching process, the pulling force produced by the auto-folding propellers 13 gradually turns to the vertical upward direction. Then a loss of velocity happens due to the resistance and the decrease of forward thrust, which results in a drop of the lift force of the fixed wing 3. In order to balance the gravity and the decreasing lift force of the fixed wings 3, the controller 17 constantly adjust the rotation rates of the waterproof brushless motors 11 based on the state data so that the auto-folding aerial propeller blades 13 can generate enough pulling force of which vertical component can compensate the loss of lift on the fixed wing 3. After the vehicle is stabilized in hovering flight mode, the controller 17 send the command to slow down the auto-folding propellers 13. Then the vehicle descends and prepares to land on the water surface. After the vehicle lands on the water surface safely, the waterproof brushless motors 11 are shut down, and the blades of the auto-folding propellers 13 automatically fold and align with the axis of fuselage for reducing the resistance in water. Then the vehicle can start to move in water. For underwater locomotion, the controller 17 controls the open and close of the inflation solenoid valve and the deflation solenoid valve to inflate and deflate the annular air bladder 4, so as to adjust the buoyancy of the vehicle. Moreover, since the annular air bladder 4 is mounted in the nose of the vehicle, the annular air bladder 4 is inflated to not only increase the buoyancy but also move the center of buoyancy forward along the longitudinal axis of the vehicle. A resultant pitching moment caused by the difference between centers of buoyancy and gravity will force the vehicle to trim by the stern during the ascent. On the other hand, the annular air bladder 4 is deflated to cause the vehicle to descend and trim by the bow at the same time due to the backward moving of the center of buoyancy along the longitudinal axis of the vehicle. Therefore, only by controlling the inflation and deflation of the annular air bladder 4 periodically can enable the vehicle to operate in a saw-tooth gliding movement.

The specific examples of the present invention are described above. What has to be understood is that this invention is not limited to the specific way of the aforementioned implementation. Technicians can make various modifications within the scope of claims presented in this patent, which does not affect the essence of the invention. In the case of no conflict, the embodiments and their features in the invention can be arbitrarily combined.

What is claimed is:

1. A fixed-wing aerial underwater vehicle, comprising a shell component, a flight component, and a pneumatic buoyancy component; wherein the flight component comprises a fixed wing and a plurality of rotors, and the fixed wing and the rotor are all mounted on the shell component;

the pneumatic buoyancy component comprises an air bladder and an inflation and deflation portion, the air bladder is connected to the inflation and deflation portion, and the inflation and deflation portion is configured to inflate and deflate the air bladder; and the air bladder is installed on the shell component, a containing space is formed in the shell component, and the inflation and deflation portion is partially or entirely installed in the containing space;

wherein the inflation and deflation portion comprises a gas cylinder, a solenoid valve, an inflation pipe penetration member, and a deflation pipe penetration member;

the solenoid valve comprises an inflation solenoid valve and a deflation solenoid valve; and the gas cylinder, the inflation pipe penetration member, the air bladder and the deflation pipe penetration member are sequentially connected.

2. The fixed-wing aerial underwater vehicle of claim 1, wherein, the air bladder comprises an annular air bladder, and the annular air bladder is sleeved on the shell component; and a vent relief valve is arranged on the annular air bladder.

3. The fixed-wing aerial underwater vehicle of claim 1, wherein, each rotor comprises a rotor supporting rod, a motor base, a motor and a propeller, and the rotor supporting rod, the motor base, the motor and the propeller are sequentially connected; and the plurality of rotors are arranged along a circumferential direction of the shell component.

4. The fixed-wing aerial underwater vehicle of claim 3, wherein, the propeller comprises an auto-folding propeller, and the auto-folding propeller comprises an auto-folding propeller hub and a pair of auto-folding aerial propeller blades; and the motor comprises a waterproof brushless motor.

5. The fixed-wing aerial underwater vehicle of claim 1, wherein, a depth sensor, a receiver, an electronic speed controller, a battery and a controller are arranged in the containing space;

the electronic speed controller comprises a four-in-one electronic speed controller, and the battery comprises a lithium battery; and a pressure sensor is arranged on the air bladder.

6. The fixed-wing aerial underwater vehicle of claim 5, wherein, the controller comprises:

a signal acquisition module, wherein the signal acquisition module is configured to obtain a depth signal, a pressure signal and a remote control signal;

a flight control module, wherein the flight control module is configured to control the flight component to operate; and a buoyancy control module, wherein the buoyancy control module is configured to control the pneumatic buoyancy component to operate.

7. The fixed-wing aerial underwater vehicle of claim 1, wherein, the shell component comprises a sealed bottom cap, a sealed pressure shell, a sealed end cap and a top fairing, and the sealed bottom cap, the sealed pressure shell, the sealed end cap and the top fairing are sequentially connected; and the sealed bottom cap is spherical, and the top fairing is ellipsoid.

8. The fixed-wing aerial underwater vehicle of claim 7, wherein, a supporting plate and a fixed-wing supporting ring are arranged on the shell component;

the rotors are fixedly connected to the shell component by the supporting plate, and the fixed wing is fixedly connected to the shell component by the fixed-wing supporting ring; and the fixed-wing supporting ring comprises an upper fixed-wing supporting ring and a lower fixed-wing supporting ring, and the upper fixed-wing supporting ring and the lower fixed-wing supporting ring are arranged along an axial direction of the shell component.

9. A control method for a fixed-wing aerial underwater vehicle, wherein the fixed-wing aerial underwater vehicle comprises a shell component, a flight component, and a pneumatic buoyancy component wherein the flight component comprises a fixed wing and a plurality of rotors, and the fixed wing and the rotor are all mounted on the shell component the pneumatic buoyancy component comprises an air bladder and an inflation and deflation portion, the air bladder is connected to the inflation and deflation portion, and the inflation and deflation portion is configured to inflate and deflate the air bladder; and the air bladder is installed on the shell component, a containing space is formed in the shell component, and the inflation and deflation portion is partially or entirely installed in the containing space, and the control method comprising following steps:

flying out of water: opening a inflation solenoid valve to inflate an annular air bladder; when an air pressure in the annular air bladder reaches a set value, closing the inflation solenoid valve, then a waterproof brushless motor operating, and an auto-folding propeller rotating and unfolding;

flying control: controlling an output current of the waterproof brushless motor by a four-in-one electronic speed controller to cause a rotational speed difference between a plurality of auto-folding propellers to achieve different motions;

entering the water: turning off the waterproof brushless motor, the auto-folding propeller folding, opening a deflation solenoid valve to deflate the annular air bladder; when the air pressure in the annular air bladder reaches the set value, closing the deflation solenoid valve; and gliding underwater: controlling an opening and a closing of the inflation solenoid valve and the deflation solenoid valve to change a volume of the annular air bladder.

10. The control method of claim 9, wherein, each rotor comprises a rotor supporting rod, a motor base, a motor and a propeller, and the rotor supporting rod, the motor base, the motor and the propeller are sequentially connected; and the plurality of rotors are arranged along a circumferential direction of the shell component.

11. The control method of claim 10, wherein, the propeller comprises an auto-folding propeller, and the auto-folding propeller comprises an auto-folding propeller hub and a pair of auto-folding aerial propeller blades; and the motor comprises a waterproof brushless motor.

12. The control method of claim 9, wherein, the inflation and deflation portion comprises a gas cylinder, a solenoid valve, an inflation pipe penetration member, and a deflation pipe penetration member;

the solenoid valve comprises an inflation solenoid valve and a deflation solenoid valve; and the gas cylinder, the inflation pipe penetration member, the air bladder and the deflation pipe penetration member are sequentially connected.

13. The control method of claim 12, wherein, the air bladder comprises an annular air bladder, and the annular air bladder is sleeved on the shell component; and a vent relief valve is arranged on the annular air bladder.

14. The control method of claim 9, wherein, a depth sensor, a receiver, an electronic speed controller, a battery and a controller are arranged in the containing space;

the electronic speed controller comprises a four-in-one electronic speed controller, and the battery comprises a lithium battery; and a pressure sensor is arranged on the air bladder.

15. The control method of claim 14, wherein, the controller comprises:

a signal acquisition module, wherein the signal acquisition module is configured to obtain a depth signal, a pressure signal and a remote control signal;

a flight control module, wherein the flight control module is configured to control the flight component to operate; and a buoyancy control module, wherein the buoyancy control module is configured to control the pneumatic buoyancy component to operate.

16. The control method of claim 9, wherein, the shell component comprises a sealed bottom cap, a sealed pressure shell, a sealed end cap and a top fairing, and the sealed bottom cap, the sealed pressure shell, the sealed end cap and the top fairing are sequentially connected; and the sealed bottom cap is spherical, and the top fairing is ellipsoid.

17. The control method of claim 16, wherein, a supporting plate and a fixed-wing supporting ring are arranged on the shell component;

the rotors are fixedly connected to the shell component by the supporting plate, and the fixed wing is fixedly connected to the shell component by the fixed-wing supporting ring; and the fixed-wing supporting ring comprises an upper fixed-wing supporting ring and a lower fixed-wing supporting ring, and the upper fixed-wing supporting ring and the lower fixed-wing supporting ring are arranged along an axial direction of the shell component.

* * * * *